United States Patent
Wiseman et al.

(10) Patent No.: US 10,259,018 B2
(45) Date of Patent: Apr. 16, 2019

(54) REMOVING SEALANT AROUND A SEAL CAP

(71) Applicant: The Boeing Company, Chicago, IL (US)

(72) Inventors: Jesse Randal Wiseman, Everett, WA (US); Roger A. Gage, Marysville, WA (US); Matthew Gregory Kesterson, Everett, WA (US); Stephan Joel Favilla, Everett, WA (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 15/066,027

(22) Filed: Mar. 10, 2016

(65) Prior Publication Data

US 2017/0259306 A1     Sep. 14, 2017

Related U.S. Application Data

(62) Division of application No. 13/886,557, filed on May 3, 2013, now Pat. No. 9,295,367.

(60) Provisional application No. 61/778,389, filed on Mar. 12, 2013.

(51) Int. Cl.
*B08B 1/00* (2006.01)
*F16B 37/14* (2006.01)

(52) U.S. Cl.
CPC .............. *B08B 1/005* (2013.01); *F16B 37/14* (2013.01)

(58) Field of Classification Search
CPC ........ B08B 1/005; F16B 37/14; F16B 33/004; B29C 65/48; B29C 66/032; A47L 13/08; B05C 11/02; B05C 17/00503; B05C 17/10; B64D 45/02; Y10T 156/10; Y10T 156/17

See application file for complete search history.

(56) References Cited

U.S. PATENT DOCUMENTS

| | | | |
|---|---|---|---|
| 9,295,367 B2 | 3/2016 | Wiseman et al. | |
| 2011/0311730 A1 | 12/2011 | Atsebha et al. | |
| 2014/0261956 A1* | 9/2014 | Wiseman | A47L 13/08 156/60 |

FOREIGN PATENT DOCUMENTS

| | | |
|---|---|---|
| GB | 2481299 A | 12/1911 |
| WO | WO2012107741 A1 | 8/2012 |

OTHER PUBLICATIONS

International Search Report and Written Opinion, dated May 6, 2014, regarding Application No. PCT/US2014/018357, 8 pages.
PRC Seal Caps Application Guide, Customized Sealant Solutions, PPG Aerospace, PRC-DeSoto International, Inc., May 2011, 2 pages, accessed Apr. 29, 2013. http://www.ppg.com/coatings/aerospace/sealants/sealantsproducts/Documents/SealCapApplicationGuide.pdf.

(Continued)

*Primary Examiner* — Vishal I Patel
(74) *Attorney, Agent, or Firm* — Yee & Associates, P.C.

(57) ABSTRACT

A method and apparatus for sealing a fastener element. A structure may be positioned over a seal cap that has been adhered and sealed to the fastener element. A number of projections associated with the structure may be moved along an interface formed between the seal cap and an object in which the fastener element has been installed such that the number of projections removes at least a portion of excess material around the seal cap while moving along the interface between the seal cap and the object.

6 Claims, 10 Drawing Sheets

(56) References Cited

OTHER PUBLICATIONS

PRC Seal Caps, Customized Sealant Solutions, PPG Aerospace, PRC-DeSoto International, Inc., Feb. 2011, 2 pages, accessed Apr. 29, 2013. http://www.ppg.com/coatings/aerospace/sealants/sealantsproducts/Documents/SealCapFlyer.pdf.
Office Action, dated Apr. 29, 2016, regarding U.S. Appl. No. 13/886,557, 14 pages.
Notice of Allowance, dated Nov. 13, 2015, regarding U.S. Appl. No. 13/886,557, 9 pages.

\* cited by examiner

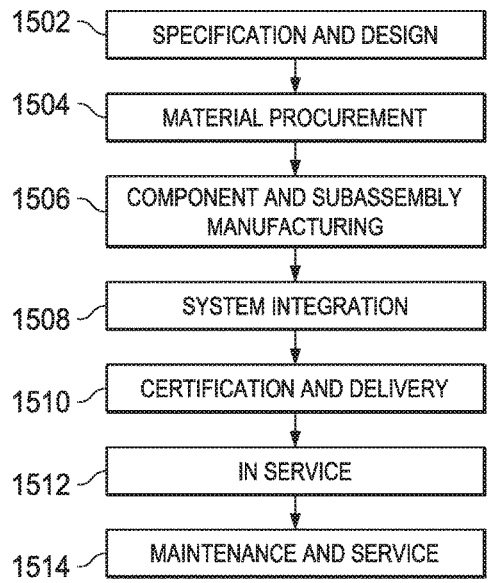
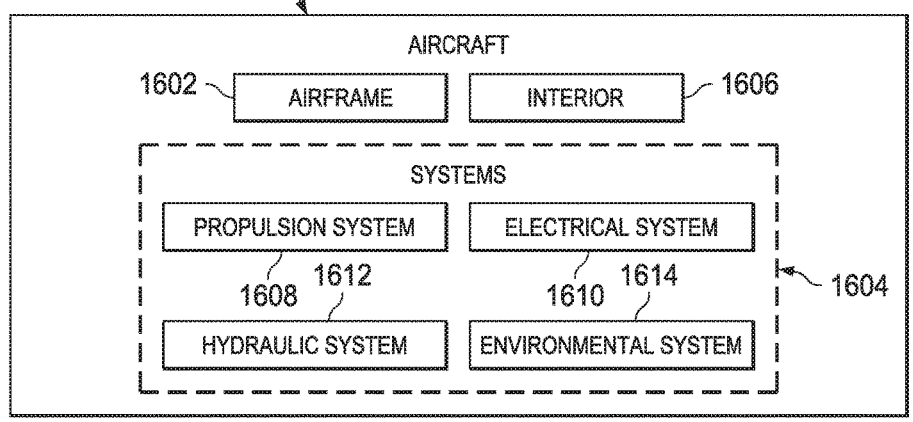

REMOVING SEALANT AROUND A SEAL CAP

This application is a divisional of and claims the benefit of priority to U.S. patent application Ser. No. 13/886,557, filed May 3, 2013, now U.S. Pat. No. 9,295,367, which claims the benefit of U.S. Provisional Application No. 61/778,389, filed Mar. 12, 2013, the disclosure of which is incorporated herein in its entirety.

BACKGROUND INFORMATION

1. Field

The present disclosure relates generally to seal caps and, in particular, to the installation of seal caps. Still more particularly, the present disclosure relates to a method and apparatus for removing excess sealant that squeezes out of a seal cap during installation of the seal cap.

2. Background

Seal caps may be used to cover and seal fastener elements such as, for example, without limitation, screws and bolts. Typically, a seal cap may be installed over a fastener element by applying a sealant material within a cap and then placing the cap over the head of the fastener element. In some cases, the cap may be referred to as the seal cap. In other cases, the cap and the sealant material may together form a seal cap.

During installation, the cap and the sealant material may be pressed down over the fastener element to ensure that the sealant material adheres to and fully covers the fastener element. However, oftentimes, excess sealant material may squeeze out and around the cap when the cap and the sealant material within the cap are placed over the fastener element and pressed downwards. The excess sealant material around the cap may be undesirable. For example, without limitation, seal caps may be used for an object in which multiple fastener elements have been installed. Excess sealant material may reduce the aesthetic appeal of the object into which the fastener element has been installed. Further, the excess sealant material may increase the weight of the object more than desired. In some cases, excess sealant material may separate and become foreign object debris. For example, without limitation, when used inside of a fuel tank, the flow of the fuel within the fuel tank may cause some of the excess sealant material to break apart and form undesired debris within the fuel tank.

With some currently available methods for installing seal caps, excess sealant material that squeezes out of a seal cap may be removed and/or smoothed by hand. However, this process may be more time-consuming than desired. When an object comprises multiple fastener elements over which seal caps are to be installed, the time needed to remove and/or smooth out this excess sealant material may increase production times and/or costs for the object more than desired. Therefore, it would be desirable to have a method and apparatus that take into account at least some of the issues discussed above, as well as other possible issues.

SUMMARY

In one illustrative embodiment, an apparatus may comprise a number of projections associated with a structure configured to be positioned over a seal cap that has been adhered and sealed to a fastener element. The number of projections is configured to remove at least a portion of excess material around the seal cap when the number of projections is moved along an interface formed between the seal cap and an object in which the fastener element has been installed.

In another illustrative embodiment, a sealant installation system may comprise a tool and a sealant application device. The tool may comprise a structure and a number of projections associated with the structure. The structure may have a hollow portion configured to receive a seal cap in which the hollow portion may extend through the structure to form a channel. The number of projections may be configured to remove at least a portion of excess material around the seal cap and smooth out any remaining portion of the excess material when the structure is rotated about the seal cap. The sealant application device may be configured for insertion through the channel of the structure. The sealant application device may be further configured to inject a material into the seal cap when the seal cap is positioned over a fastener element. The excess material may be a portion of the material that squeezes out of the seal cap.

In yet another illustrative embodiment, a method for sealing a fastener element. A structure may be positioned over a seal cap that has been adhered and sealed to the fastener element. A number of projections associated with the structure may be moved along an interface formed between the seal cap and an object in which the fastener element has been installed such that the number of projections removes at least a portion of excess material around the seal cap while moving along the interface between the seal cap and the object.

In still yet another illustrative embodiment, a method for sealing a fastener element is provided. A seal cap may be adhered to the fastener element using a sealant material in which excess sealant material squeezes out around the seal cap. A structure may be positioned over the seal cap such that the seal cap is received within a hollow portion of the structure. The structure may be rotated about the seal cap such that a number of projections associated with the structure rotates and removes at least a portion of the excess sealant material around the seal cap and smoothes out any remaining portion of the excess material as the structure rotates about the seal cap.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 15 is an illustration of an aircraft manufacturing and service method in the form of a block diagram in accordance with an illustrative embodiment; and FIG. 16 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a method and apparatus for installing a seal cap over a fastener element that reduces the overall time needed to install the seal cap. The illustrative embodiments also recognize and take into account that it may be desirable to have a tool that may be configured to remove and smooth out excess sealant material that squeezes out of a seal cap during installation such that the remaining portion of sealant material around the seal cap is of a specified amount and/or a specified thickness.

Figure 1:
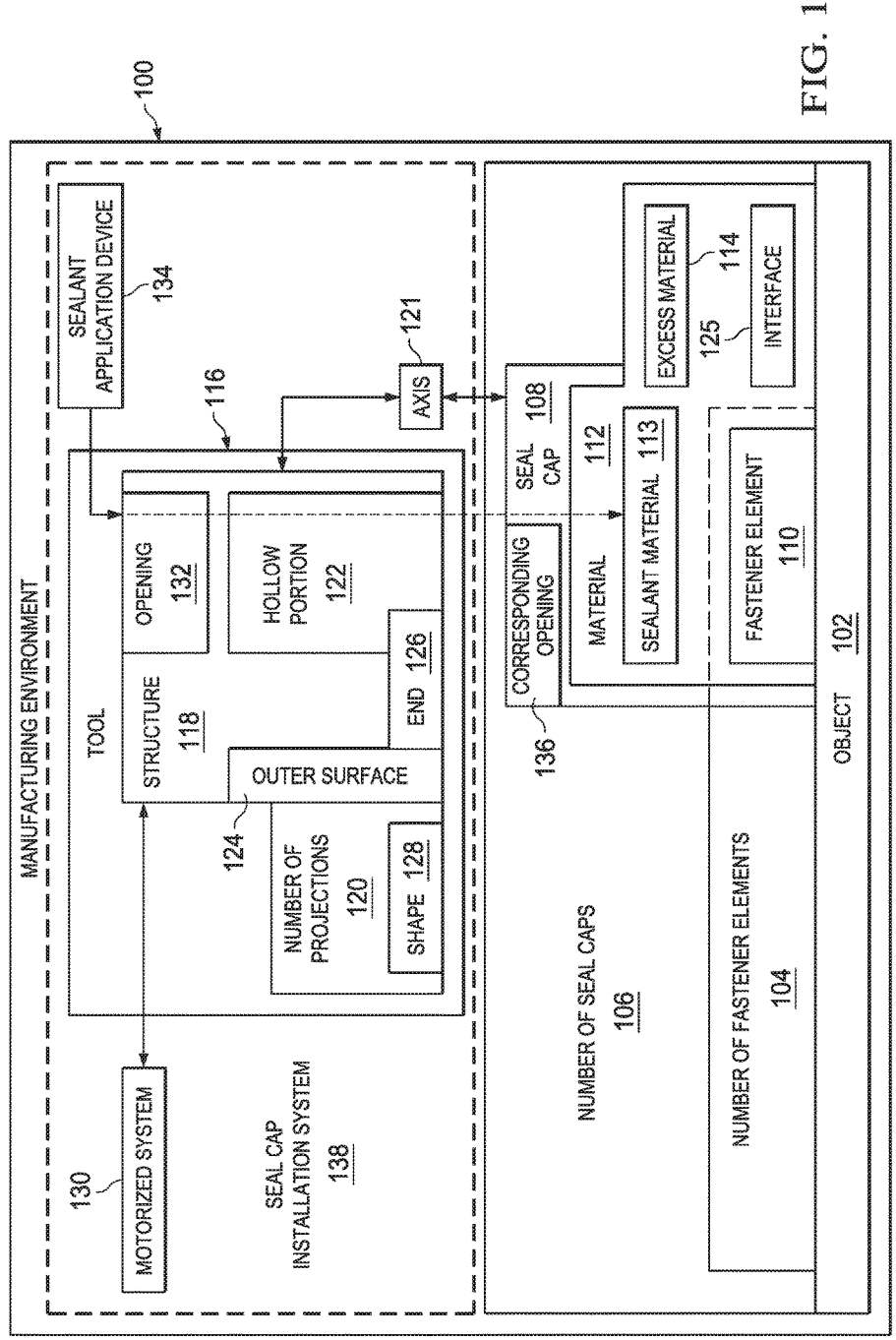
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. Manufacturing environment 100 is an example of one environment in which object 102 may be formed. Object 102 may take a number of different forms. Object 102 may take the form of, for example, without limitation, a wing box, a spar assembly, a structural frame, or some other type of object.

Object 102 may be formed using number of fastener elements 104. As used herein, a "number of" items may include one or more items. In this manner, number of fastener elements 104 may include one or more fastener elements. Number of fastener elements 104 may be installed along any portion of object 102. Number of fastener elements 104 may include at least one of a screw, a bolt, a pin, a tie, a clamp, or some other type of fastener element.

As used herein, the phrase "at least one of," when used with a list of items, may mean different combinations of one or more of the listed items may be used and only one of the items in the list may be needed. The item may be a particular object, thing, or category. In other words, "at least one of" may mean any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Number of seal caps 106 may be used to cover and seal number of fastener elements 104. In particular, a seal cap in number of seal caps 106 may be used to cover and seal a corresponding fastener element in number of fastener elements 104. As one illustrative example, seal cap 108 in number of seal caps 106 may be used to cover and seal fastener element 110 in number of fastener elements 104.

Seal cap 108 may be used to reduce the possibility of any fluid, such as a liquid, air, or some other type of fluid, passing through the interface between fastener element 110 and object 102. Further, seal cap 108 may reduce the possibility of any undesirable material, such as, for example, without limitation, dirt particles and/or other substances, from passing through the interface between fastener element 110 and object 102. Additionally, seal cap 108 may also be used to reduce and/or prevent undesired effects resulting from electromagnetic events such as, for example, without limitation, plasma ejections during lightning strikes and/or other types of electromagnetic events.

In one illustrative example, seal cap 108 may be installed over fastener element 110 by applying material 112 over fastener element 110 and then placing seal cap 108 over material 112. In some cases, seal cap 108 may be installed over fastener element 110 by injecting material 112 into a hollow portion of seal cap 108 and then placing seal cap 108 with material 112 inside seal cap 108 over fastener element 110. In this illustrative example, material 112 may take the form of sealant material 113. However, in some cases, material 112 may be an adhesive material or some other type of material.

Seal cap 108 may be pressed down towards fastener element 110 such that seal cap 108 adheres to material 112 and, consequently, adheres to and seals fastener element 110 underneath material 112. During this process, excess material 114 may squeeze out and around seal cap 108. In particular, excess material 114 may squeeze out along interface 125 between seal cap 108 and object 102.

In one illustrative example, seal cap 108 may be considered properly sealed to fastener element 110 and object 102 when excess material 114 squeezes out around the entire perimeter of interface 125 between seal cap 108 and object 102. In some cases, seal cap 108 may be considered properly sealed to fastener element 110 and object 102 when excess material 114 has a desired thickness and/or extends a desired distance from seal cap 108 along interface 125 between seal cap 108 and object 102.

Tool 116 may be used to remove at least a portion of excess material 114 around seal cap 108. As used herein, "at least a portion" may be some or all of excess material 114. In one illustrative example, tool 116 may include structure 118 and number of projections 120 associated with structure 118.

As used herein, when one component is "associated" with another component, this association may be a physical association in the depicted examples. For example, without limitation, a first component, such as one of number of projections 120, may be considered to be associated with a second component, such as structure 118, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Structure 118 may have hollow portion 122. Hollow portion 122 may be configured to receive seal cap 108. In particular, structure 118 may be placed over seal cap 108 such that seal cap 108 may be received within hollow portion 122 of structure 118.

Number of projections 120 may extend from outer surface 124 of structure 118 at and/or near end 126 of structure 118. Number of projections 120 may be used to remove at least a portion of excess material 114 around interface 125 between seal cap 108 and object 102. In particular, number of projections 120 may be moved along interface 125 formed between seal cap 108 and object 102 such that at least a portion of excess material 114 around seal cap 108 along interface 125 is removed.

For example, without limitation, structure 118 may be rotated about seal cap 108. In particular, structure 118 may be rotated about axis 121, which may, in turn, cause rotation of number of projections 120 associated with structure 118 about axis 121. In one illustrative example, axis 121 may be a center axis through structure 118 of tool 116. In other illustrative examples, axis 121 may be offset from a center axis through structure 118. When structure 118 is rotated about axis 121 through structure 118, number of projections 120 may remove at least a portion of excess material 114 around seal cap 108.

Number of projections 120 may be configured such that the portion of excess material 114 left remaining after rotation of structure 118 about axis 121 is a specified amount and/or has a specified thickness, within selected tolerances. In some cases, one rotation, or turn, of structure 118 may result in this specified amount and/or specified thickness of excess material 114 being left by number of projections 120.

Each of number of projections 120 may have shape 128 configured such that rotation of structure 118 and number of projections 120 allows at least a portion of excess material 114 to be removed. In some cases, shape 128 of each of number of projections 120 may be configured such that some portion of excess material 114 is collected during this removal.

In one illustrative example, shape 128 may be a helical shape. For example, without limitation, shape 128 of each of number of projections 120 may be the shape of a portion of a helix. In another illustrative example, shape 128 of each of number of projections 120 may be a curved shape, such as the curved shape of a propeller blade. Of course, in other illustrative examples, shape 128 of each of number of projections 120 may be some other type of curved shape or some other type of shape.

Additionally, during the rotation of structure 118, the portion of excess material 114 not removed by number of projections 120 may be smoothed out by number of projections 120. In particular, shape 128 of each of number of projections 120 may be configured such that number of projections 120 smooth out any remaining portion of excess material 114. By smoothing out the remaining portion of excess material 114, this remaining portion of excess material 114 may be substantially free of voids, open spaces, and/or debris.

Tool 116 may be operated by a human operator, a robotic operator, or some other type of operator, depending on the implementation. For example, without limitation, a human operator may be able to rotate structure 118 of tool 116 once structure 118 has been placed over seal cap 108. Using tool 116 may allow a human operator better control when smoothing out excess material 114 as compared to smoothing out excess material 114 by hand, using a flat-edged tool, or some other type of tool.

In one illustrative example, tool 116 may be used with motorized system 130. For example, without limitation, tool 116 may be attached to motorized system 130. In particular, structure 118 may be configured for attachment to motorized system 130. Motorized system 130 may be configured to rotate structure 118 when tool 116 is attached to motorized system 130. In some cases, motorized system 130 may be an end effector device configured for use with a robotic operator. The robotic operator may take the form of, for example, without limitation, a robotic arm. Depending on the implementation, motorized system 130 may be pneumatically powered, electrically powered, or powered in some other manner.

In one illustrative example, structure 118 may have opening 132. Opening 132 may be an opening into hollow portion 122 of structure 118. Opening 132 may be configured to receive sealant application device 134. Sealant application device 134 may be inserted through opening 132 and passed through hollow portion 122 of structure 118. In one illustrative example, sealant application device 134 may be an elongate device around which structure 118 may be positioned.

Sealant application device 134, with structure 118 around sealant application device 134, may be used to inject sealant material 113 into seal cap 108 through corresponding opening 136 in seal cap 108 when seal cap 108 has already been positioned over fastener element 110. Once sealant application device 134 has finished injecting sealant material 113 into seal cap 108 through corresponding opening 136, structure 118 may be moved along sealant application device 134 and positioned over seal cap 108 for use in removing at least a portion of excess material 114. For example, without limitation, structure 118 may be slid down the length of sealant application device 134 until structure 118 covers seal cap 108.

In this manner, sealant application device 134 and tool 116 may together form seal cap installation system 138 that may be capable of both injecting sealant material 113 into seal cap 108 and removing any undesirable excess sealant material around seal cap 108 along interface 125 between seal cap 108 and object 102. In some cases, when motorized system 130 is used to rotate structure 118, motorized system 130 may be considered part of seal cap installation system 138.

In this illustrative example, number of projections 120 may be comprised of any number of materials. Depending on the implementation, each of number of projections 120 may be comprised of at least one of a silicone material, a rubber material, a polymer, nylon, plastic, or some other type of material. The one or more materials out of which number of projections 120 may be formed may be selected for the purposes of smoothing out excess material 114.

Depending on the implementation, tool 116 may be a disposable tool. In this manner, the number of cleanup operations that may need to be performed and/or the total amount of time needed to seal number of fastener elements 104 may be reduced. In some cases, number of projections 120 may be removably attached to structure 118. In other words, number of projections 120 may be disposable. In some cases, number of projections 120 may be removed from structure 118 such that a different set of projections may be used.

The illustration of manufacturing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
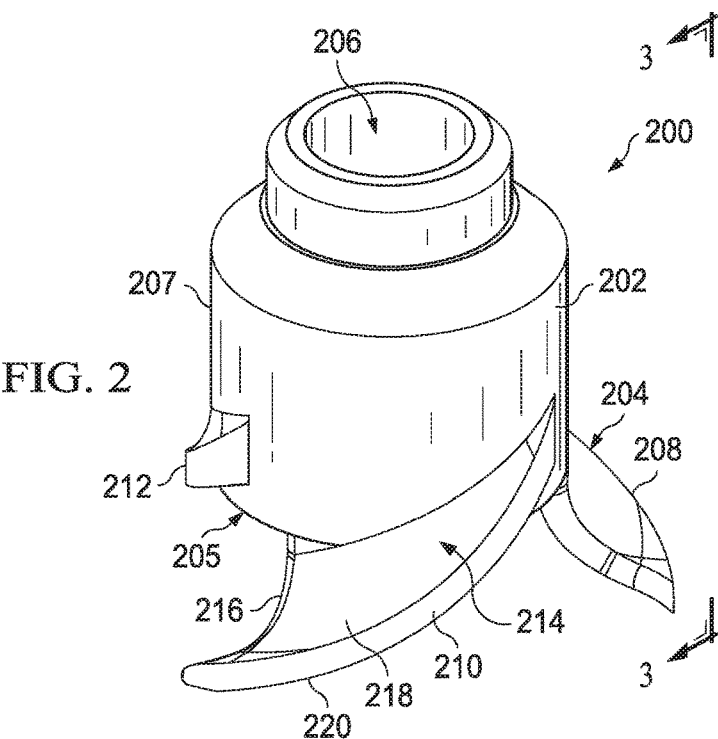
FIG. 2 is an illustration of a top isometric view of a tool in accordance with an illustrative embodiment.

With reference now to FIG. 2, an illustration of a top isometric view of a tool is depicted in accordance with an illustrative embodiment. In this illustrative example, tool 200 may be an example of one implementation for tool 116 in FIG. 1. In this illustrative example, tool 200 may include structure 202 and number of projections 204.

Number of projections 204 may extend from structure 202 at end 205 of structure 202. Structure 202 and number of projections 204 may be examples of implementations for structure 118 and number of projections 120, respectively, in FIG. 1.

As depicted, structure 202 may have hollow portion 206. Hollow portion 206 may be an example of one implementation for hollow portion 122 in FIG. 1. In this illustrative example, hollow portion 206 may extend throughout the entire length of structure 202. In particular, hollow portion 206 may form a channel through structure 202.

Number of projections 204 may include projection 208, projection 210, and projection 212. These projections may extend from outer surface 207 of structure 202. Outer surface 207 may be an example of one implementation for outer surface 124 in FIG. 1. As depicted, each of number of projections 204 may have shape 214. Shape 214 may be an example of one implementation for shape 128 in FIG. 1.

In this illustrative example, shape 214 may be a helical shape. Further, shape 214 may be selected such that each of number of projections 204 may be capable of removing and collecting excess sealant material. For example, without limitation, with shape 214, projection 210 may have edge 216, first surface 218, and second surface 220.

Edge 216 may have a texture configured to remove material. First surface 218 may be configured such that any material removed by edge 216 may be collected on top of first surface 218. Second surface 220 may be configured such that any remaining material below second surface 220 is smoothed. For example, without limitation, second surface 220 may be a smooth surface. In some cases, second surface 220 may have a texture configured to remove material below second surface 220. For example, without limitation, second surface 220 may have a texture configured to scrape away or pull away material in contact with second surface 220 when structure 202 is rotated.

Figure 3:
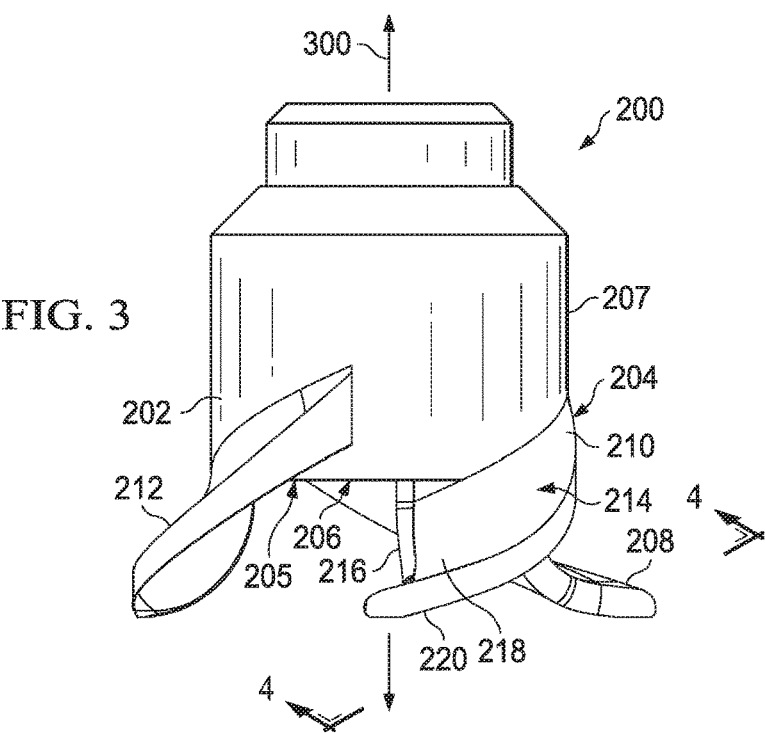
FIG. 3 is an illustration of a side view of a tool in accordance with an illustrative embodiment.

Turning now to FIG. 3, an illustration of a side view of tool 200 from FIG. 2 is depicted in accordance with an illustrative embodiment. As depicted, number of projections 204 may extend past structure 202. When used to remove excess material around a seal cap, structure 202 may be rotated about axis 300 such that the edge of each of number of projections 204 leads. For example, without limitation, structure 202 may be rotated about axis 300 such that edge 216 of projection 210 leads the rest of projection 210.

Figure 4:
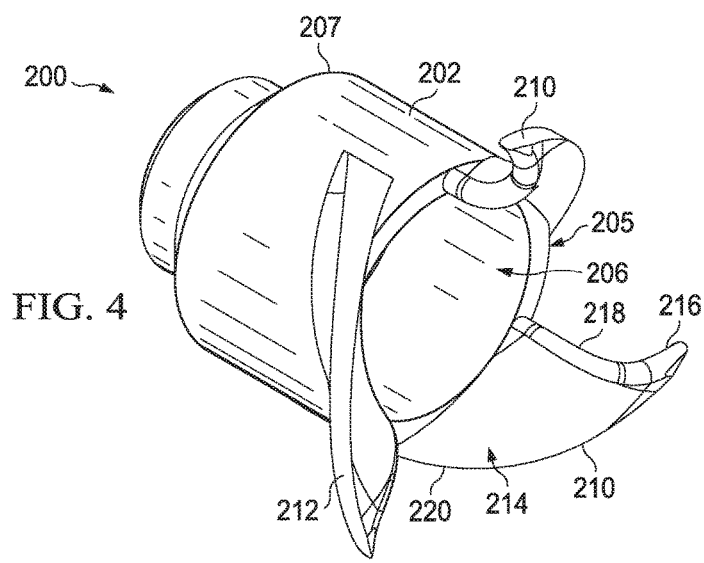
FIG. 4 is an illustration of an isometric view of a tool with respect to a bottom end of the tool in accordance with an illustrative embodiment.

With reference now to FIG. 4, an illustration of an isometric view of tool 200 from FIGS. 2-3 is depicted with respect to a bottom end of tool 200 in accordance with an illustrative embodiment. In this illustrative example, hollow portion 206 of structure 202 may be seen as extending all the way through structure 202.

Referring now to FIGS. 5-8, illustrations of a process for installing a seal cap over a fastener element are depicted in accordance with an illustrative embodiment. The process illustrated in FIGS. 5-8 may be an example of one manner in which seal cap 108 in FIG. 1 may be installed over fastener element 110 in FIG. 1. The process illustrated in FIGS. 5-8 may be performed using tool 200 from FIGS. 2-4.

Figure 5:
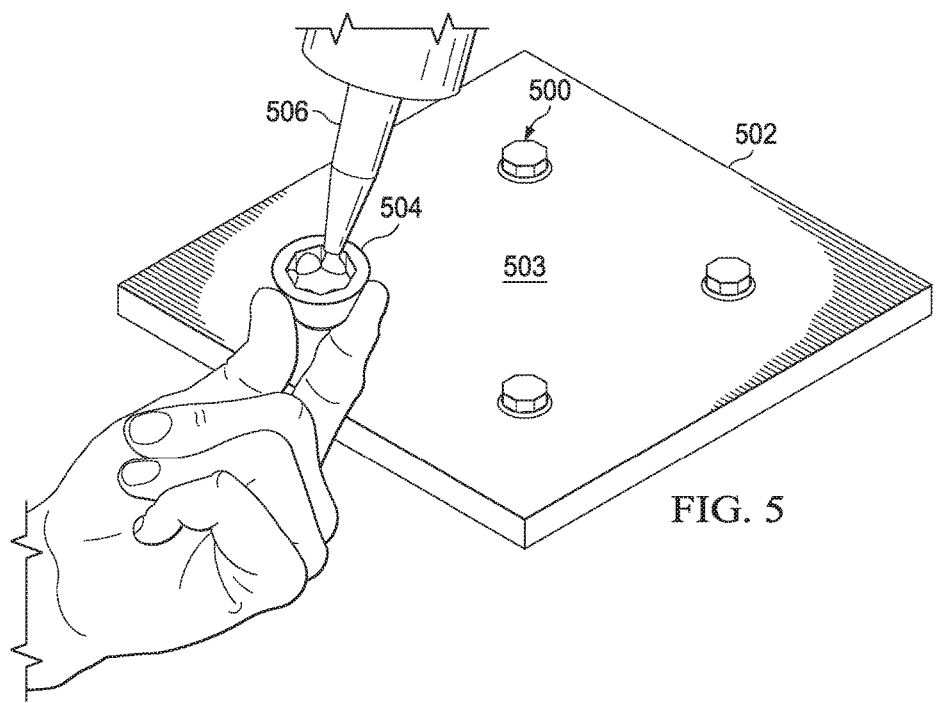
FIG. 5 is an illustration of sealant material being applied to a seal cap in accordance with an illustrative embodiment.

With reference now to FIG. 5, an illustration of sealant material being applied to a seal cap is depicted in accordance with an illustrative embodiment. In this illustrative example, number of fastener elements 500 may be installed in object 502. Number of fastener elements 500 may be an example of one implementation for number of fastener elements 104 in FIG. 1. Object 502 may be an example of one implementation for object 102 in FIG. 1.

As depicted, number of fastener elements 500 may be exposed at surface 503 of object 502. Seal cap 504 may be used to cover and seal one of number of fastener elements 500 (not shown in this view). Seal cap 504 may be an example of one implementation for seal cap 108 in FIG. 1. In this illustrative example, sealant application device 506 may be used to apply sealant material (not shown) inside seal cap 504. Sealant application device 506 may be an example of one implementation for sealant application device 134 in FIG. 1. Sealant material (not shown) dispensed from sealant application device 506 may be applied to seal cap 504 for use in adhering and sealing seal cap 504 to one of number of fastener elements 500.

Figure 6:
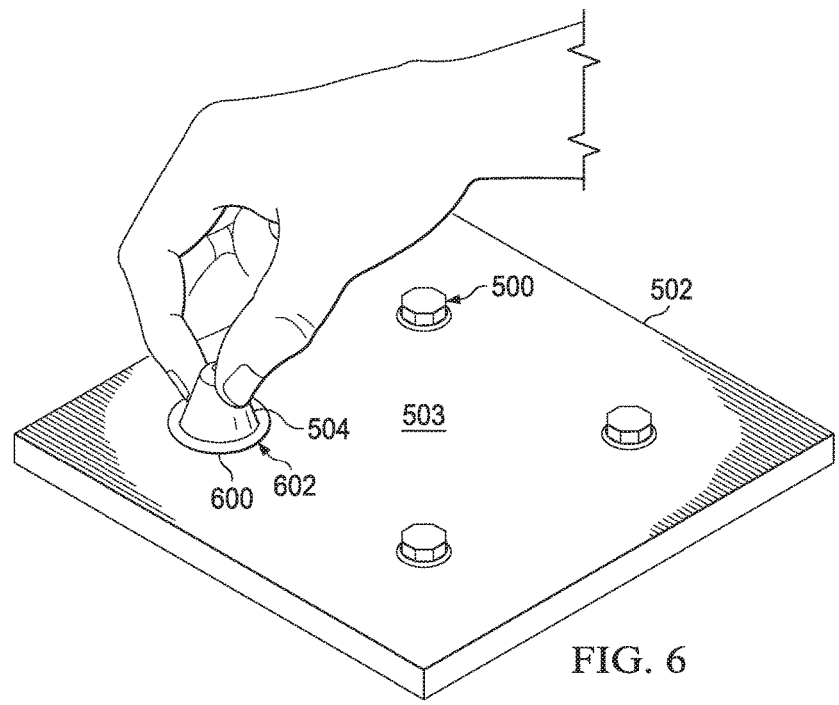
FIG. 6 is an illustration of a seal cap being placed over a fastener element in accordance with an illustrative embodiment.

With reference now to FIG. 6, an illustration of seal cap 504 being placed over a fastener element is depicted in accordance with an illustrative embodiment. In FIG. 6, seal cap 504 may be placed over one of number of fastener elements 500. The particular fastener element may not be depicted in this view.

When seal cap 504 is placed over this fastener element, excess sealant material 600 may squeeze out of a gap between surface 503 of object 502 and seal cap 504. In particular, excess sealant material 600 may squeeze out around and along interface 602 between seal cap 504 and surface 503 of object 502. Excess sealant material 600 may be an example of one implementation for excess material 114 in FIG. 1.

Excess sealant material 600 around seal cap 504 may be a factor in determining whether the seal between seal cap 504, object 502, and the fastener element (not shown) underneath seal cap 504 meets selected requirements. These selected requirements may be, for example, engineering requirements, assembly requirements, and/or other types of requirements.

For example, without limitation, meeting these requirements may require that excess sealant material 600 squeezes out around the entire perimeter of interface 602 between seal cap 504 and object 502. In some cases, meeting these requirements may require that excess sealant material 600 have a desired thickness and/or extend a desired distance past interface 602.

Figure 7:
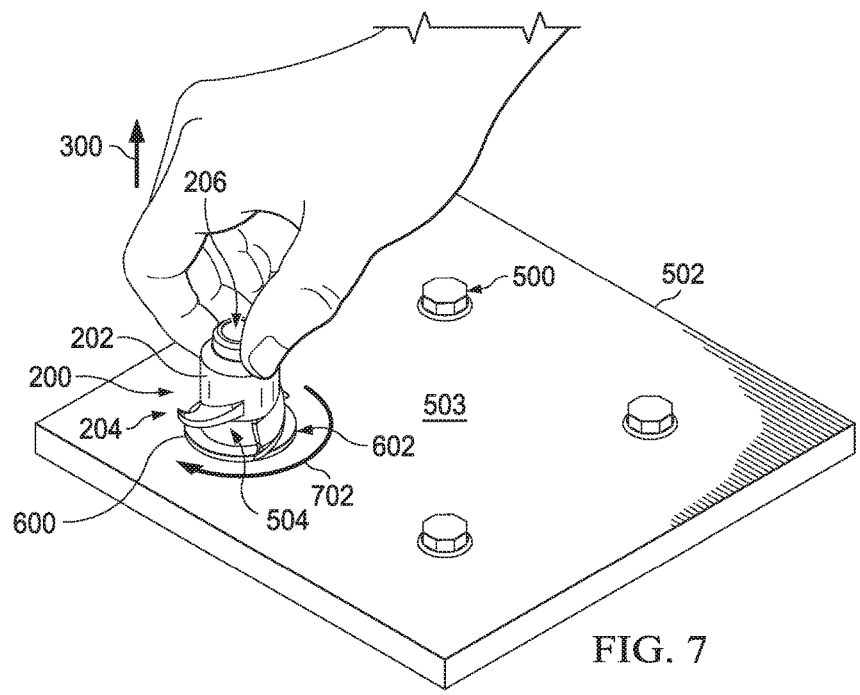
FIG. 7 is an illustration of a tool being used to remove excess sealant material in accordance with an illustrative embodiment.

With reference now to FIG. 7, an illustration of tool 200 being used to remove excess sealant material 600 from FIG. 6 is depicted in accordance with an illustrative embodiment. As depicted, tool 200 may be positioned over seal cap 504.

Structure 202 may be moved in such a manner that causes number of projections 204 associated with structure 202 to move along interface 602 between seal cap 504 and object 502. In particular, structure 202 of tool 200 may be rotated in the direction of arrow 702 about seal cap 504, which may cause rotation of number of projections 204 associated with structure 202.

Rotation of structure 202 with structure 202 positioned over seal cap 504 may cause at least a portion of excess sealant material 600 to be removed and/or any remaining portion of excess sealant material 600 not removed to be smoothed out by number of projections 204. Structure 202 may be turned any number of times in the direction of arrow 702, depending on the implementation. In this illustrative example, one complete rotation of structure 202 about axis 300 may sufficiently remove a portion of excess sealant material 600 along interface 602 such that the remaining portion of excess sealant material 600 may be of a specified amount and/or have a specified thickness, within selected tolerances.

Figure 8:
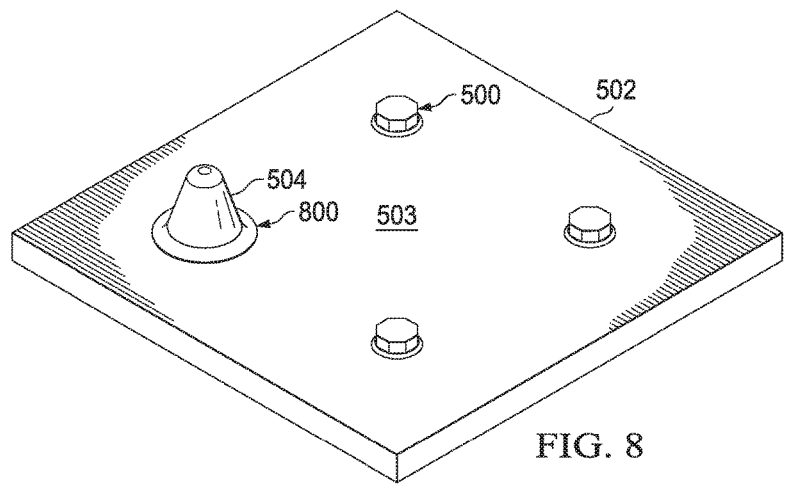
FIG. 8 is an illustration of smoothed sealant material around a seal cap in accordance with an illustrative embodiment.

With reference now to FIG. 8, an illustration of smoothed sealant material around seal cap 504 is depicted in accordance with an illustrative embodiment. In this illustrative example, smoothed sealant material 800 may be the remaining portion of excess sealant material 600 from FIGS. 6-7 after the rotation of structure 202 of tool 200 with number of projections 204 described in FIG. 7.

Figure 9:
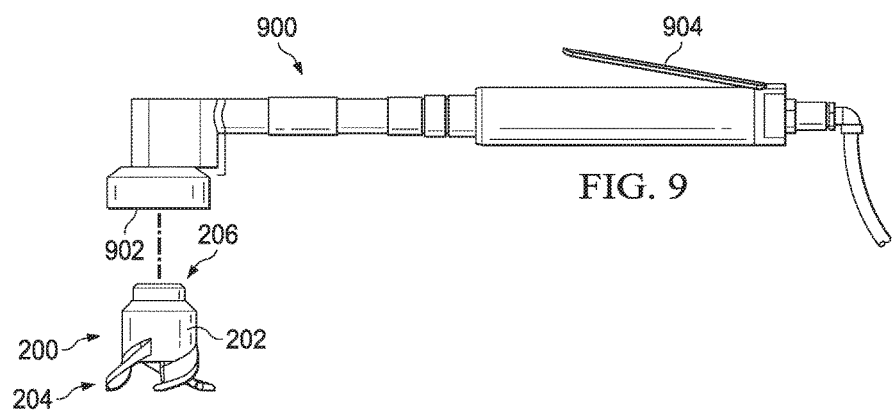
FIG. 9 is an illustration of a motorized system for use with a tool in accordance with an illustrative embodiment.

With reference now to FIG. 9, an illustration of a motorized system for use with tool 200 from FIGS. 2-4 is depicted in accordance with an illustrative embodiment. In this illustrative example, motorized system 900 may be an example of one implementation for motorized system 130 in FIG. 1.

As depicted, motorized system 900 may have retaining structure 902 and lever 904. Retaining structure 902 may be configured to hold tool 200. Lever 904 may be used to cause operation of a motor (not shown in this view) within motorized system 900. Operation of this motor may cause rotation of tool 200, or more specifically, structure 202 of tool 200.

Figure 10:
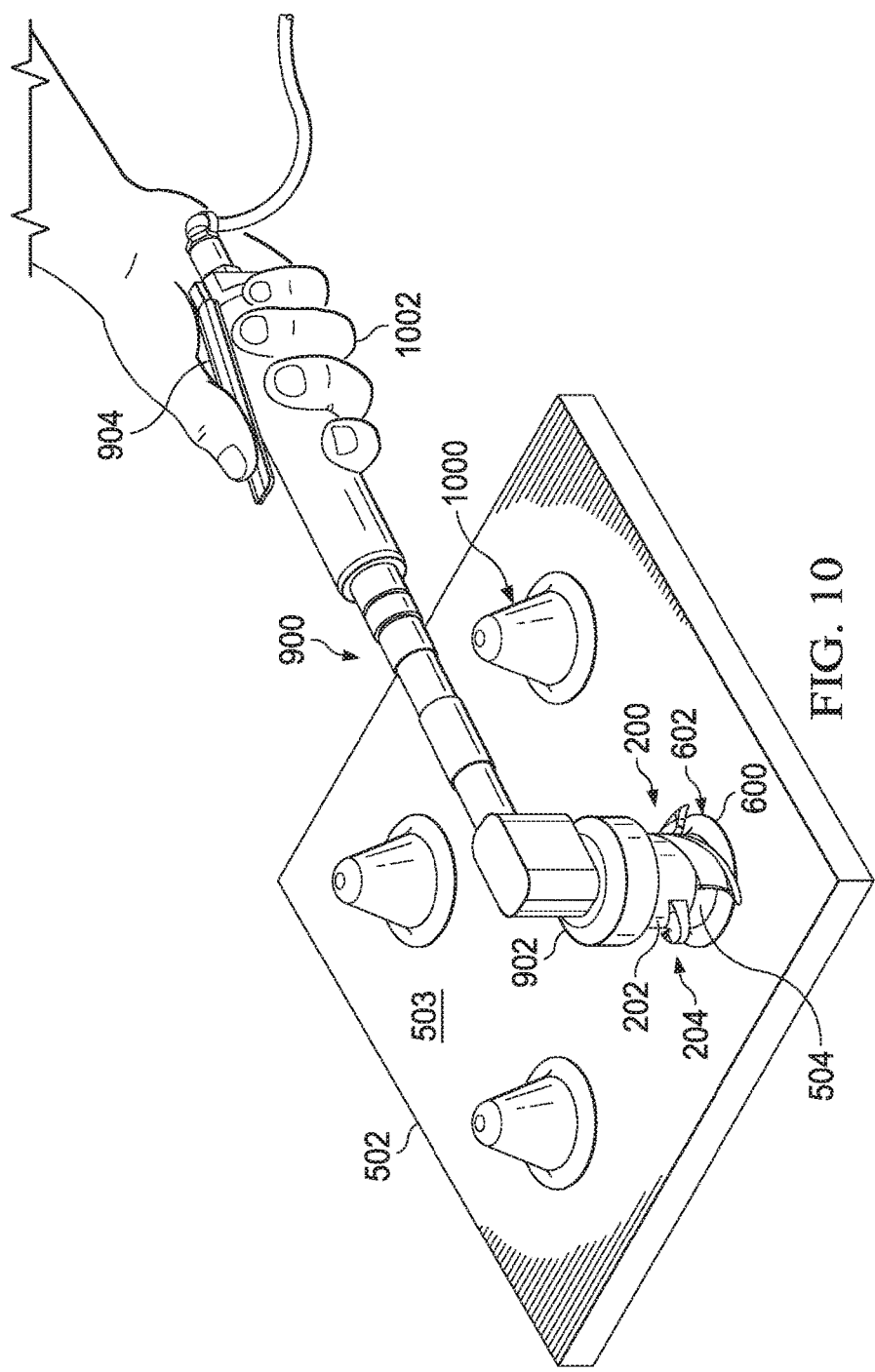
FIG. 10 is an illustration of a tool being used with a motorized system in accordance with an illustrative embodiment.

Turning now to FIG. 10, an illustration of tool 200 being used with motorized system 900 from FIG. 9 is depicted in accordance with an illustrative embodiment. In this illustrative example, number of seal caps 1000 may be placed over number of fastener elements 500 from FIG. 5 (not shown in this view). Tool 200 has been attached to motorized system 900 and may be held by retaining structure 902 of motorized system 900.

As depicted, motorized system 900 and tool 200 may be positioned such that tool 200 may be placed over seal cap 504. Human operator 1002 may use lever 904 to operate the motor (not shown in this view) inside motorized system 900 to rotate tool 200. In this manner, motorized system 900 may be used to rotate tool 200 to remove at least a portion of excess sealant material 600.

Figure 11:
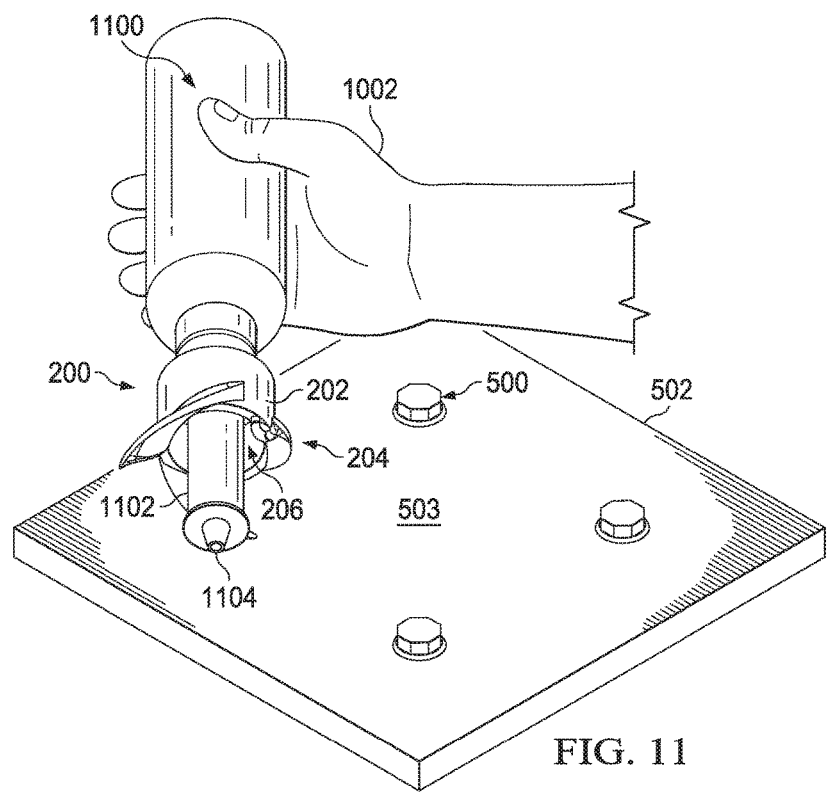
FIG. 11 is an illustration of a sealant application device for use with a tool in accordance with an illustrative embodiment.

With reference now to FIG. 11, an illustration of a sealant application device for use with tool 200 from FIGS. 2-4 is depicted in accordance with an illustrative embodiment. In this illustrative example, sealant application device 1100 may be an example of one implementation for sealant application device 134 from FIG. 1. As depicted, sealant application device 1100 may be inserted through hollow portion 206 of structure 202.

In this illustrative example, sealant application device 1100 may include elongate member 1102 and nozzle tip 1104. Elongate member 1102 may be the portion of sealant application device 1100 inserted through hollow portion 206 of structure 202. Nozzle tip 1104 may be configured to inject sealant into a seal cap, such as seal cap 504 from FIG. 5.

Figure 12:
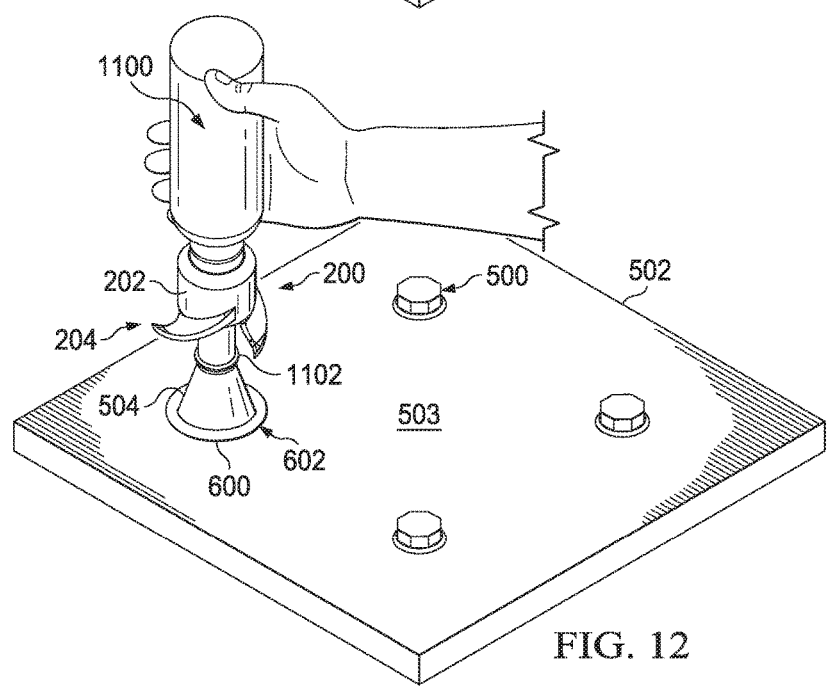
FIG. 12 is an illustration of a sealant application device injecting sealant into a seal cap in accordance with an illustrative embodiment.

Turning now to FIG. 12, an illustration of sealant application device 1100 from FIG. 11 injecting sealant into seal cap 504 from FIG. 5 is depicted in accordance with an illustrative embodiment. In this illustrative example, sealant application device 1100 may be positioned such that nozzle tip 1104 from FIG. 4 (not shown in this view) is inserted into an opening (not shown in this view) of seal cap 504.

Sealant material (not shown in this view) may be injected from nozzle tip 1104 into seal cap 504 for use in adhering and sealing seal cap 504 to the fastener element (not shown in this view) underneath seal cap 504 and to object 502. Once the inside of seal cap 504 has been filled with sealant material, tool 200 may be moved relative to sealant application device 1100. In particular, tool 200 may be slid down sealant application device 1100 and positioned over seal cap 504 for use in removing at least a portion of excess sealant material 600 around seal cap 504.

The illustrations of tool 200 in FIGS. 2-4, the process described in FIGS. 5-8, motorized system 900 in FIGS. 9-10, and sealant application device 1100 in FIGS. 11-12 are not meant to imply physical or architectural limitations to the manner in which an illustrative embodiment may be implemented. Other components in addition to or in place of the ones illustrated may be used. Some components may be optional.

The different components shown in FIGS. 2-12 may be illustrative examples of how components shown in block form in FIG. 1 can be implemented as physical structures. Additionally, some of the components in FIGS. 2-12 may be combined with components in FIG. 1, used with components in FIG. 1, or a combination of the two.

Figure 13:
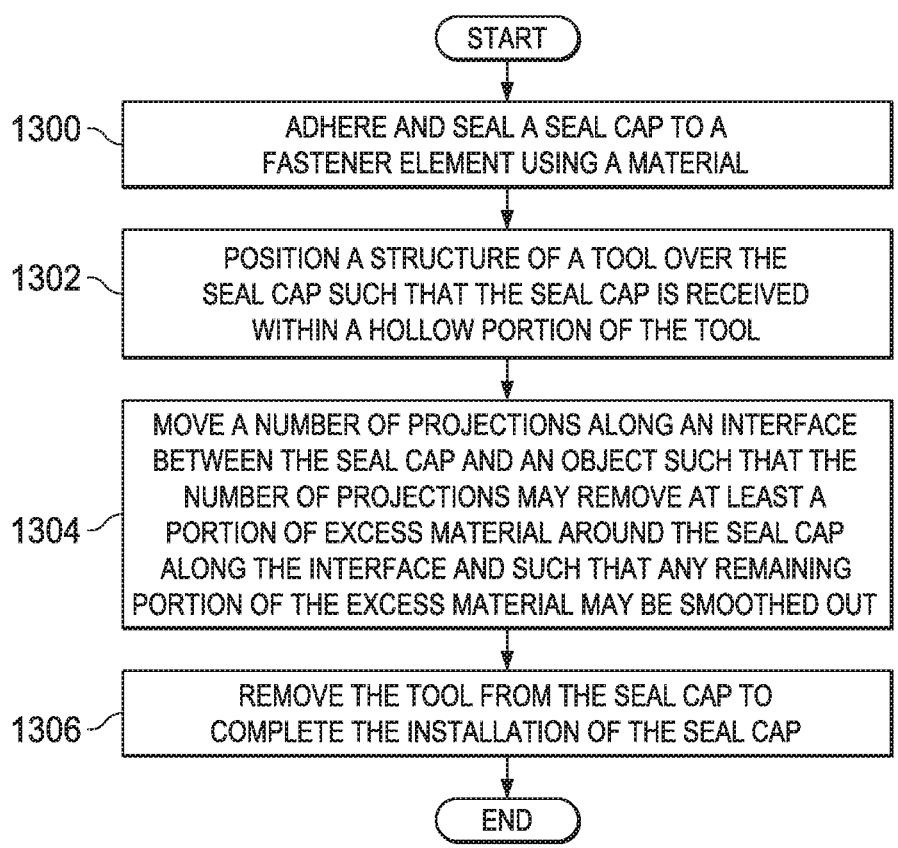
FIG. 13 is an illustration of a process for installing a seal cap in the form of a flowchart in accordance with an illustrative embodiment.

With reference now to FIG. 13, an illustration of a process for installing a seal cap is depicted in the form of a flowchart in accordance with an illustrative embodiment. The process illustrated in FIG. 13 may be implemented to install, for example, without limitation, seal cap 108 over fastener element 110 using tool 116 as described in FIG. 1.

The process may begin by adhering and sealing seal cap 108 to fastener element 110 using material 112 (operation 1300). In operation 1300, material 112 may be sealant material 113. In one illustrative example, sealant material 113 may be injected into a hollow portion of seal cap 108 prior to seal cap 108 being placed over fastener element 110. In another illustrative example, sealant material 113 may be applied to fastener element 110 prior to placing seal cap 108 over fastener element 110.

During operation 1300, a portion of material 112, which may be excess material 114, squeezes out of seal cap 108 and onto object 102 in which fastener element 110 has been installed. In particular, excess material 114 may squeeze out around and along interface 125 between seal cap 108 and object 102. Seal cap 108 may be considered properly sealed to fastener element 110 and object 102 when excess material 114 squeezes out around the entire perimeter of interface 125 between seal cap 108 and object 102. In some cases, seal cap 108 may be considered properly sealed to fastener element 110 and object 102 when excess material 114 has a desired thickness and/or extends a desired distance from seal cap 108 along interface 125 between seal cap 108 and object 102.

Once seal cap 108 has been adhered and sealed to fastener element 110, structure 118 of tool 116 may be positioned over seal cap 108 such that seal cap 108 is received within hollow portion 122 of tool 116 (operation 1302). Structure 118 may have number of projections 120 that extend from structure 118.

Thereafter, number of projections 120 may be moved along interface 125 between seal cap 108 and object 102 such that number of projections 120 may remove at least a portion of excess material 114 around seal cap 108 along interface 125 and such that any remaining portion of excess material 114 may be smoothed out (operation 1304). Operation 1304 may be performed by, for example, without limitation, rotating structure 118 such that number of projections 120 may be rotated around seal cap 108 along interface 125. Tool 116 may then be removed from seal cap 108 to complete the installation of seal cap 108 (operation 1306), with the process terminating thereafter.

Depending on the implementation, operation 1304 may be performed by a human operator, a robotic operator, or some other type of operator. In one illustrative example, tool 116 may be attached to motorized system 130. Motorized system 130 may be used to rotate structure 118. Motorized system 130 may be operable by a human operator or a robotic operator. Depending on the implementation, motorized system 130 may be pneumatically powered, electrically powered, or powered in some other manner.

The process described in FIG. 13 may be repeated for every seal cap in number of seal caps 106 in FIG. 1. Using tool 116 to remove excess material 114 around each of number of seal caps 106 may reduce the overall time and/or cost needed to install number of seal caps 106 over number of fastener elements 104 in FIG. 1.

Figure 14:
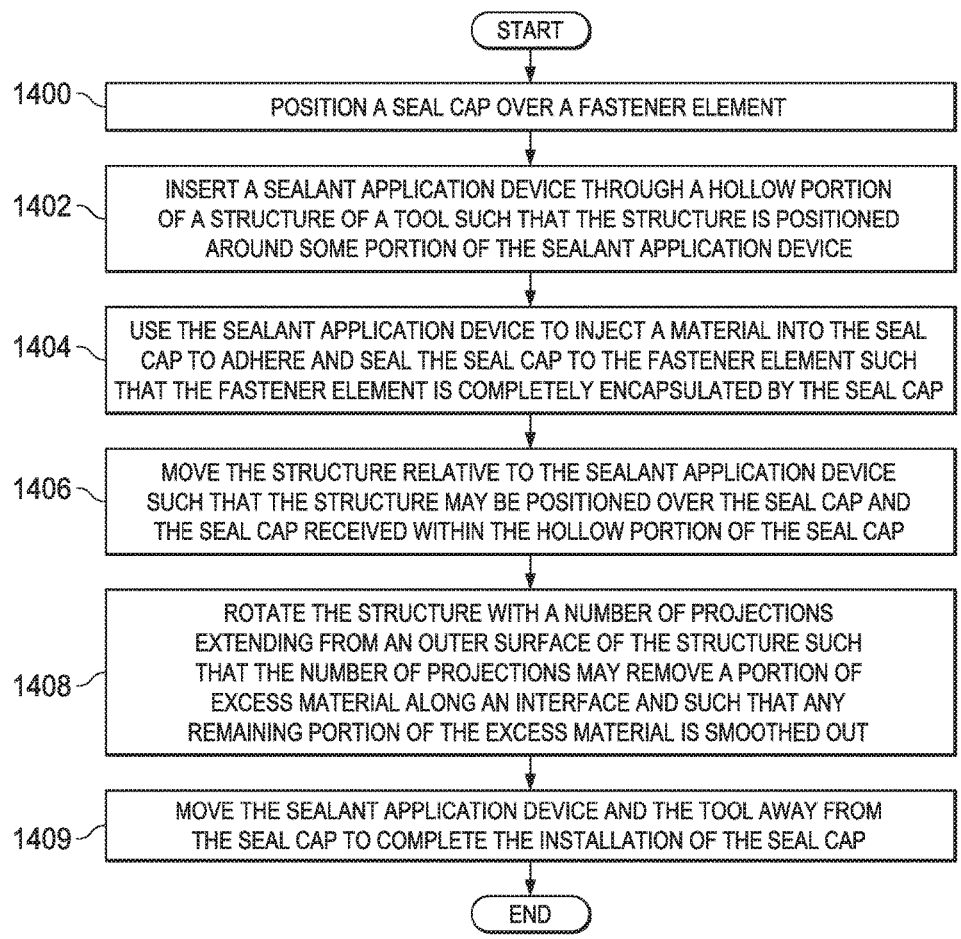
FIG. 14 is another illustration of a process for installing a seal cap in the form of a flowchart in accordance with an illustrative embodiment.

With reference now to FIG. 14, another illustration of a process for installing a seal cap is depicted in the form of a flowchart in accordance with an illustrative embodiment. The process illustrated in FIG. 14 may be implemented to install, for example, without limitation, seal cap 108 over fastener element 110 using tool 116 and sealant application device 134 as described in FIG. 1.

The process may begin by positioning seal cap 108 over fastener element 110 (operation 1400). Next, sealant application device 134 may be inserted through hollow portion 122 of structure 118 of tool 116 such that structure 118 is positioned around some portion of sealant application device 134 (operation 1402).

Sealant application device 134 may then be used to inject material 112 into seal cap 108 to adhere and seal seal cap 108 to fastener element 110 such that fastener element 110 is completely encapsulated by seal cap 108 (operation 1404). In operation 1404, material 112 may cause excess material 114 to squeeze out of seal cap 108. Material 112 may be sealant material 113 and excess material 114 may be an excess portion of sealant material 113. Seal cap 108 may be considered properly sealed to fastener element 110 and object 102 when the excess portion of sealant material 113 squeezes out around and along interface 125 in a manner that meets selected requirements.

Structure 118 may be moved relative to sealant application device 134 such that structure 118 may be positioned over seal cap 108 and seal cap 108 received within hollow portion 122 of seal cap 108 (operation 1406). Structure 118 with number of projections 120 extending from outer surface 124 of structure 118 may be rotated such that number of projections 120 may remove a portion of excess material 114 along interface 125 and such that any remaining portion of excess material 114 may be smoothed out (operation 1408). Operation 1408 may be performed such that the remaining portion of excess material 114 is of a specified amount and/or has a specified thickness, within selected tolerances. Sealant application device 134 and tool 116 may be moved away from seal cap 108 to complete the installation of seal cap 108 (operation 1410), with the process terminating thereafter.

The process described in FIG. 14 may be repeated a number of times to install number of seal caps 106 over number of fastener elements 104. In some cases, all of number of seal caps 106 may be placed over number of fastener elements 104 prior to material 112 being injected into each of number of seal caps 106. The process described in FIG. 14 may be used to reduce overall seal cap installation times and/or costs. Further, the process described in FIG. 14 may be performed by a human operator and/or a robotic operator, depending on the implementation.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method in the form of a block diagram is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft in the form of a block diagram is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. In particular, tool 116 from FIG. 1 may be used for removing excess sealant material around seal caps during any one of the stages of aircraft manufacturing and service method 1500. For example, without limitation, tool 116 from FIG. 1 may be used during the installation of seal caps during at least one of component and subassembly manufacturing 1506, system integration 1508, routine maintenance and service 1514, or some other stage of aircraft manufacturing and service method 1500.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512 and/or during maintenance and service 1514 in FIG. 15. The use of a number of the different illustrative embodiments may substantially expedite the assembly of and/or reduce the cost of aircraft 1600.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for sealing a fastener element, the method comprising:
   rotating a structure about a seal cap that has been adhered and sealed to the fastener element; and
   moving a number of projections associated with the structure along an interface formed between the seal cap and an object in which the fastener element has been installed such that the number of projections removes at least a portion of excess material around the seal cap while moving along the interface between the seal cap and the object.

2. The method of claim 1, wherein moving the number of projections comprises:
   rotating the structure about the seal cap using a motorized system such that the number of projections associated with the structure is rotated.

3. The method of claim 1, wherein rotating the structure about the seal cap comprises:
   rotating the structure about a center axis of the seal cap such that the number of projections associated with the structure are rotated around the seal cap along the interface between the seal cap and the object.

4. A method for sealing a fastener element, the method comprising:
   squeezing out excess sealant material around a seal cap;
   positioning a structure over the seal cap such that the seal cap is received within a hollow portion of the structure; and
   rotating the structure about the seal cap such that a number of projections associated with the structure rotates and removes at least a portion of the excess sealant material around the seal cap and smooths out any remaining portion of the excess material as the structure rotates about the seal cap.

5. The method of claim 4 further comprising:
   adhering the seal cap to the fastener element using the sealant material.

6. A method for sealing a fastener element, the method comprising:
   rotating a structure about a seal cap that has been sealed to the fastener element;
   moving a number of projections associated with the structure along an interface formed between the seal cap and an object in which the fastener element has been installed; and
   removing at least a portion of excess material around the seal cap while moving the number of projections along the interface between the seal cap and the object.

* * * * *